United States Patent
Trika et al.

(10) Patent No.: US 8,966,160 B2
(45) Date of Patent: Feb. 24, 2015

(54) STORAGE DEVICE TRIMMING

(71) Applicants: Sanjeev N. Trika, Hillsboro, OR (US); Anand S. Ramalingam, Hillsboro, OR (US); Richard P. Mangold, Forest Grove, OR (US)

(72) Inventors: Sanjeev N. Trika, Hillsboro, OR (US); Anand S. Ramalingam, Hillsboro, OR (US); Richard P. Mangold, Forest Grove, OR (US)

(73) Assignee: Intel Corporation, Santa Clara ( * ) Notice: Subject to any disclaimer, the term of this patent is extended or adjusted under 35 U.S.C. 154(b) by 133 days.

(21) Appl. No.: 13/630,571

(22) Filed: Sep. 28, 2012

(65) Prior Publication Data

US 2014/0095767 A1    Apr. 3, 2014

(51) Int. Cl.
*G06F 12/00*    (2006.01)
*G06F 12/02*    (2006.01)

(52) U.S. Cl.
CPC .... *G06F 12/0246* (2013.01); *G06F 2212/7201* (2013.01)
USPC ................................. 711/103; 711/E12.008

(58) Field of Classification Search
None
See application file for complete search history.

(56) References Cited

U.S. PATENT DOCUMENTS

2013/0219106 A1*    8/2013    Vogan et al. ................... 711/103

* cited by examiner

*Primary Examiner* — Kevin Verbrugge
(74) *Attorney, Agent, or Firm* — Chapin IP Law, LLC (57) ABSTRACT

In an embodiment, a command that specifies a logical block to trim in a storage device is acquired. An entry in a logical-to-physical address (L2P) table that contains a physical address that corresponds to the logical block may be set to point to an invalid address. A trim token that specifies the logical block may be generated. The trim token may be stored in a non-volatile storage contained in the storage device.

20 Claims, 10 Drawing Sheets

| TYPE 510 | LOGICAL BLOCK ADDRESS RANGE 520 |

FIG. 5

```
For each LBA L of R
    L2P[L] = invalid
End for
Store Trim Token in NAND specifying that R is trimmed
Lock the band that contains the Trim Token
```
⎫
⎬ 620
⎭

```
If (L2P[X] is invalid)
    return (0)
Else
    Normal Read Processing
```
⎫
⎬ 630
⎭

```
Normal context-save processing
Unlock the locked bands
```
⎫
⎬ 640
⎭

```
If Trim token is encountered that specifies trim of LBA X
then
    L2P[X] = invalid
Lock the current replay band that contains the Trim Token
```
⎫
⎬ 650
⎭

STORAGE DEVICE TRIMMING

BACKGROUND

A computing device may use one or more storage systems to store information. The information may include, for example, data and/or executable instructions. The storage systems may include a primary storage and a secondary storage. A primary storage may be a storage that is directly accessible to a processor that may be contained in the computing device. The processor may access the primary storage via a memory bus that may contain provisions for transferring information between the processor and the primary storage. A secondary storage may be a storage that may not be directly accessible to the processor. Here, information may be transferred between the processor and the secondary storage via one or more input/output (I/O) channels that may be part of an I/O bus.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

A computing device may include a non-volatile storage device that the computing device may use to store data that is to survive after power is lost to the computing device. For example, a computing device, such as a smart phone, tablet, or ultrabook, may contain a processor and a solid-state disk (SSD). The SSD may provide a non-volatile storage for the computing device. The processor may use the SSD to store information (e.g., data, computer-executable instructions) for a user of the computing device. The information may include, for example, data and/or applications that may be used by the user. By storing the information in the SSD, the information may be persisted such that the information may be retained in the SSD after power is lost to the computing device. The processor may retrieve the persisted information from the SSD after power is restored to the computing device.

A non-volatile storage device, such as an SSD, may contain a logical-to-physical (L2P) table, which the non-volatile storage device may use to translate logical block addresses (LBAs) to physical addresses. The physical address may be used by the non-volatile storage device to identify, for example, a physical page that may be contained in a non-volatile storage that may be part of the non-volatile storage device. In addition, the non-volatile storage device may support a trim command, which may be used by a host (e.g., computing device that communicates with the non-volatile storage device) to specify LBAs that may no longer be in use by the host and therefore may be reused (e.g., by the non-volatile storage device).

After power is restored to a non-volatile storage device, the non-volatile storage device may rebuild the logical-to-physical (L2P) table. Rebuilding the L2P table may involve marking entries in the L2P table, associated with trimmed LBAs, as invalid. In order to rebuild the L2P table using trim information the trim information may have to be saved after power is lost to the non-volatile storage device. One way to save trim information after power is lost to the non-volatile storage device is to use capacitors to power the non-volatile storage device long enough to save the trim information. However, using capacitors to power the non-volatile storage device may add to the cost of the non-volatile storage device. Techniques described herein may obviate using capacitors in an non-volatile storage device to save trim information that may be used, for example, to rebuild an L2P table after power is restored to the non-volatile storage device.

Figure 1:
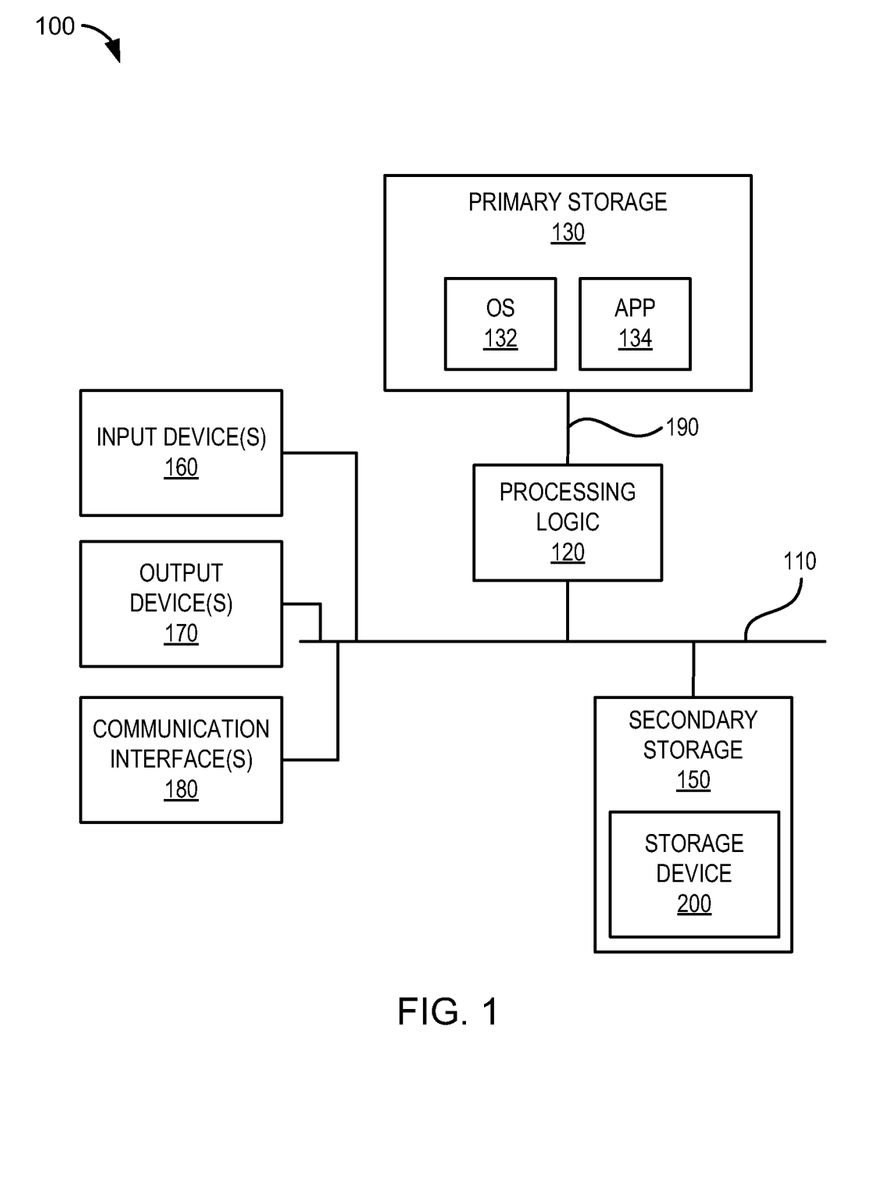
FIG. 1 illustrates a block diagram of an example embodiment of a computing device.

FIG. 1 illustrates a block diagram of an example embodiment of a computing device 100. Referring to FIG. 1, computing device 100 may include various components such as, for example, processing logic 120, primary storage 130, secondary storage 150, one or more input devices 160, one or more output devices 170, and one or more communication interfaces 180.

It should be noted that FIG. 1 illustrates an example embodiment of computing device 100. Other embodiments of computing device 100 may include more components or fewer components than the components illustrated in FIG. 1. Further, the components may be arranged differently than as illustrated in FIG. 1. For example, in an embodiment of computing device 100, secondary storage 150 may be contained at a remote site that provides "cloud" storage. The site may be accessible to computing device 100 via a communications network, such as, for example, the Internet. A communication interface 180 may be used to interface the computing device 100 with the communications network.

Also, it should be noted that functions performed by various components contained in other embodiments of computing device 100 may be distributed among the components differently than as described herein.

Computing device 100 may include an input/output (I/O) bus 110 that may enable communication among components in computing device 100, such as, for example, processing logic 120, secondary storage 150, one or more input devices 160, one or more output devices 170, and one or more communication interfaces 180. The communication may include, among other things, transferring, for example, control signals and/or data between the components. I/O busses that may be used to implement I/O bus 110 may include, for example, serial AT attachment (SATA), peripheral component interconnect (PCI), PCI express (PCI-e), universal serial bus (USB), small computer system interface (SCSI), serial attached SCSI (SAS), or some other I/O bus.

Computing device 100 may include a memory bus 190 that may enable information, which may be stored in primary storage 130, to be transferred between processing logic 120 and primary storage 130. The information may include computer-executable instructions and/or data that may be executed, manipulated, and/or otherwise processed by processing logic 120.

Processing logic 120 may include logic for interpreting, executing, and/or otherwise processing information. The information may include information that may be stored in, for example, primary storage 130 and/or secondary storage 150. In addition, the information may include information that may be acquired (e.g., read, received) by one or more input devices 160 and/or communication interfaces 180.

Processing logic 120 may include a variety of heterogeneous hardware. For example, the hardware may include some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), and/or other types of processing logic that may, for example, interpret, execute, manipulate, and/or otherwise process the information. Processing logic 120 may comprise a single core or multiple cores. An example of a processor that may be used to implement processing logic 120 is the Intel Xeon processor available from Intel Corporation, Santa Clara, Calif.

Input devices 160 may include one or more devices that may be used to input information into computing device 100. The devices may include, for example, a keyboard, computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, puck, eyeball controlled device, finger mouse, light pen, light gun, neural device, eye tracking device, steering wheel, yoke, jog dial, space ball, directional pad, dance pad, soap mouse, haptic device, tactile device, neural device, multipoint input device, discrete pointing device, and/or some other input device. The information may include spatial (e.g., continuous, multi-dimensional) data that may be input into computing device 100 using, for example, a pointing device, such as a computer mouse. The information may also include other forms of data, such as, for example, text that may be input using a keyboard.

Output devices 170 may include one or more devices that may output information from computing device 100. The devices may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, printer, speaker, video projector, volumetric display device, plotter, touch screen, and/or some other output device. Output devices 170 may be directed by, for example, processing logic 120, to output the information from computing device 100. Outputting the information may include presenting (e.g., displaying, printing) the information on an output device 170. The information may include, for example, text, graphical user interface (GUI) elements (e.g., windows, widgets, and/or other GUI elements), audio (e.g., music, sounds), and/or other information that may be outputted by output devices 170.

Communication interfaces 180 may include logic for interfacing computing device 100 with, for example, one or more communications networks and enable computing device 100 to communicate with one or more entities (e.g., nodes) coupled to the communications networks. The communications networks may include, for example, the Internet, wide-area networks (WANs), local area networks (LANs), 3G and/or 4G networks. Communication interfaces 180 may include one or more transceiver-like mechanisms that may enable computing device 100 to communicate with entities coupled to the communications networks. Examples of communication interfaces 180 may include a built-in network adapter, network interface card (NIC), Personal Computer Memory Card International Association (PCMCIA) network card, card bus network adapter, wireless network adapter, Universal Serial Bus (USB) network adapter, modem, and/or other device suitable for interfacing computing device 100 to a communications network.

Primary storage 130 and secondary storage 150 may include one or memory devices. A memory device may support, for example, serial or random access to information contained in the memory device. A memory device that supports serial access to information stored in the memory device may be referred to as a serial memory device. A memory device that supports random access to information stored in the memory device may be referred to as a random access memory (RAM) device. A memory device may be, for example, a volatile or non-volatile memory device. A volatile memory device may be a memory device that may lose information stored in the device when power is removed from the device. A non-volatile memory device may be a memory device that may retain information stored in the device when power is removed from the device. Examples of memory devices may include dynamic RAM (DRAM) devices, flash memory devices, static RAM (SRAM) devices, zero-capacitor RAM (ZRAM) devices, twin transistor RAM (TTRAM) devices, read-only memory (ROM) devices, ferroelectric transistor RAM (FeTRAM) devices, magneto-resistive RAM (MRAM) devices, phase change memory (PCM) devices, PCM and switch (PCMS) devices, nanowire-based devices, resistive RAM devices (RRAM), serial electrically erasable programmable ROM (SEEPROM) devices, serial flash devices, and/or other types of memory devices.

Primary storage 130 may be accessible to processing logic 120 via memory bus 190. Primary storage 130 may store computer-executable instructions and/or data that may implement operating system (OS) 132 and application (APP) 134. The computer-executable instructions may be executed, interpreted, and/or otherwise processed by processing logic 120. The computer-executable instructions and/or data may include computer-executable instructions and/or data that may implement one or more embodiments of the invention.

Primary storage 130 may be implemented using one or more memory devices that may store information for processing logic 120. The information may include executable instructions that may be executed by processing logic 120. The information may also include data that may be manipulated by processing logic 120. The memory devices may include volatile and/or non-volatile memory devices.

OS 132 may be a conventional operating system that may implement various conventional operating system functions that may include, for example, (1) scheduling one or more portions of APP 134 to run on (e.g., be executed by) the processing logic 120, (2) managing primary storage 130, and (3) controlling access to various components in computing device 100 (e.g., input devices 160, output devices 170, communication interfaces 180, secondary storage 150) and information received and/or transmitted by these components.

Examples of operating systems that may be used to implement OS 132 may include the Linux operating system, Microsoft Windows operating system, the Symbian operating system, Mac OS operating system, and the Android operating system. A distribution of the Linux operating system that may be used is Red Hat Linux available from Red Hat Corporation, Raleigh, N.C. Versions of the Microsoft Windows operating system that may be used include Microsoft Windows Mobile, Microsoft Windows 7, Microsoft Windows Vista, and Microsoft Windows XP operating systems available from Microsoft Inc., Redmond, Wash. The Symbian operating system is available from Accenture PLC, Dublin, Ireland. The Mac OS operating system is available from Apple, Inc., Cupertino, Calif. The Android operating system is available from Google, Inc., Menlo Park, Calif.

APP 134 may be a software application that may run (execute) under control of OS 132 on computing device 100. APP 134 and/or OS 132 may contain provisions for processing transactions that may involve storing information in secondary storage 150. These provisions may be implemented using data and/or computer-executable instructions contained in APP 134 and/or OS 132.

Secondary storage 150 may include one or more storage devices, such as storage device 200. The storage devices may be accessible to processing logic 120 via I/O bus 110. The storage devices may store information (e.g., data, computer-executable instructions). The information may be executed, interpreted, manipulated, and/or otherwise processed by processing logic 120. The information may include computer-executable instructions and/or data that may implement one or more embodiments of the invention.

The storage devices may be volatile or non-volatile. Storage devices that may be included in secondary storage 150 may include, for example, magnetic disk drives, optical disk drives, random-access memory (RAM) disk drives, flash drives, SSDs, hybrid drives, and/or other storage devices. The information may be stored on one or more non-transitory tangible computer-readable media contained in the storage devices. Examples of non-transitory tangible computer-readable media that may be contained in the storage devices may include magnetic discs, optical discs, volatile memory devices, and or non-volatile memory devices.

Figure 2:
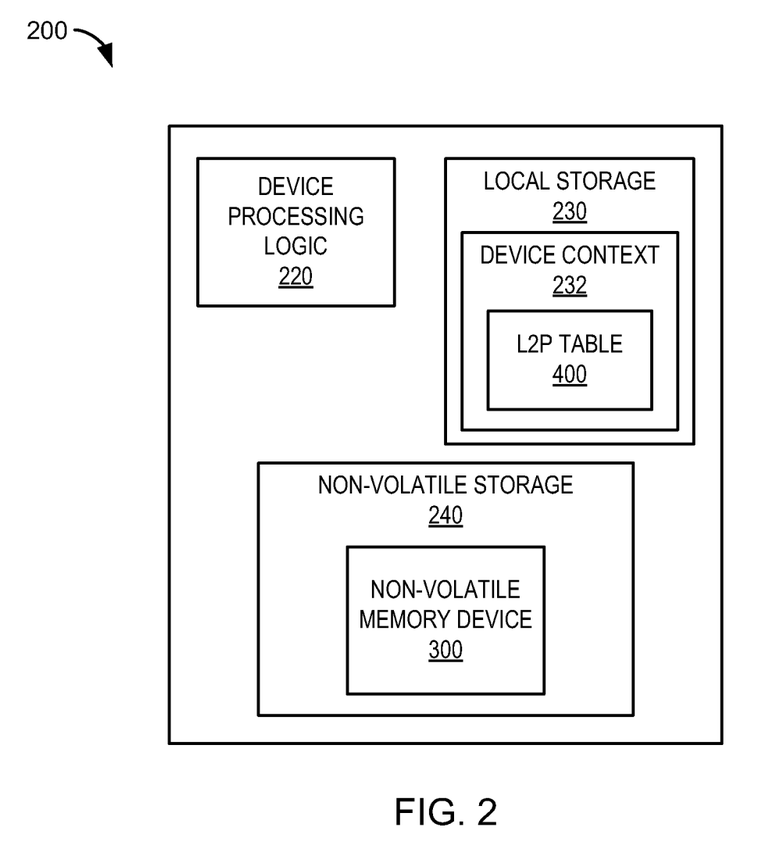
FIG. 2 illustrates an example embodiment of a storage device that may be contained in a secondary storage.

Storage device 200 may be a storage device that may contain a non-volatile storage, such as, for example, an SSD or a hybrid drive. FIG. 2 illustrates an example embodiment of storage device 200. Referring to FIG. 2, storage device 200 may include device processing logic 220, local storage 230, and a non-volatile storage 240.

The device processing logic 220 may include processing logic that may process information contained in local storage 230. The processing logic may include some combination of one or more processors, microprocessors, FPGAs, ASIPs, ASICs, CPLDs, and/or other types of processing logic that may, for example, interpret, execute, manipulate, and/or otherwise process the information. For example, the local storage 230 may store computer-executable instructions that may be executed by device processing logic 220 to defragment non-volatile storage 240, perform a power loss replay (PLR) operation that may include rebuilding L2P table 400, and/or perform other functions and/or operations that may be associated with storage device 200.

Local storage 230 may include a volatile and/or non-volatile storage that may be used to store the information that may be processed by device processing logic 220. The information may include data and/or computer-executable instructions that may be associated with an operation of storage device 200.

Local storage 230 may hold device context 232, which may include context information that may be associated with storage device 200. The context information may include a logical-to-physical (L2P) table 400 that may contain information that may be used by device processing logic 220 to translate a logical block address (LBA) to a physical address. The physical address may correspond to, for example, a physical page in non-volatile storage 240. Device processing logic 220 may use the L2P table 400 to identify a physical page in non-volatile storage 240 that corresponds to an LBA.

Storage device 200 may support logical blocks, which may be used to store information in storage device 200. A logical block may be associated with an LBA that may be used to identify the logical block. Information stored in a logical block may be accessed (e.g., read, written) by processing logic 120 using an LBA associated with the logical block. The logical block may correspond to a physical page in non-volatile storage 240. The physical page may actually physically store information associated with the logical block. L2P table 400 may contain information that may be used to identify a physical page that corresponds to a logical block.

For example, suppose processing logic 120 issues a read command to retrieve information in a logical block in storage device 200 that is associated with LBA "0". Further suppose that L2P table 400 contains an entry that indicates that LBA "0" corresponds to physical page "16" in non-volatile storage 240. Storage device 200 may acquire the command and process it. Processing may include accessing the entry in the L2P table 400 to identify that LBA "0" corresponds to physical page "16". Based on this identification, storage device 200 may retrieve the information at physical page "16" in storage device 200. Note that an embodiment of L2P table 400 that incorporates a scheme that may be used to identify physical pages in non-volatile storage 240 that correspond to LBAs will be described further below with respect to FIG. 4.

The non-volatile storage 240 may provide non-volatile storage for information written to the storage device 200. Non-volatile storage 240 may contain one or more non-volatile memory devices 300 that may be used to store the information.

Figure 3:
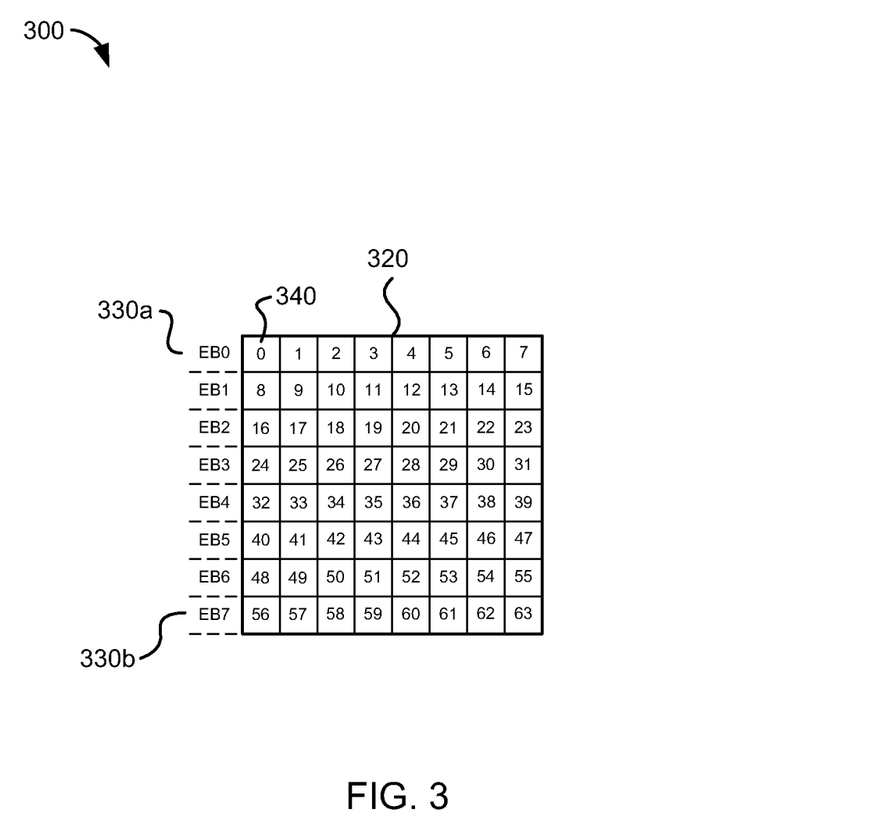
FIG. 3 illustrates an example layout of a non-volatile memory device.

Non-volatile memory device 300 may store the information in physical pages contained in the non-volatile memory device 300. A page may be a minimum sized unit that may be written in the non-volatile memory device 300. A page may be fixed in size (e.g., 2048 bytes). Pages may be organized into blocks, where a block may include one or more pages. Devices that may be used to implement non-volatile memory device 300 may include, for example, flash memory, PCM, PCMS, NAND, or some other non-volatile storage device.

An erase block (EB) may be a type of block that is associated with a group of one or more pages that may be erased as a group. For example, suppose non-volatile memory device 300 includes sixty-four pages which are divided into eight EBs where each EB includes eight different pages. Erasing an EB may cause all eight pages associated with the EB to be erased.

FIG. 3 illustrates an example layout of non-volatile memory device 300. Referring to FIG. 3, non-volatile memory device 300 may include a die 320. The die 320 may contain one or more EBs 330 wherein an EB 330 may contain one or more pages 340. In the example layout illustrated in FIG. 3, die 320 includes eight EBs (labeled "EB0" through "EB7") and sixty-four pages (numbered "0" through "63"). Further, an EB 330 includes eight pages. Thus, for example, EB 330a includes eight pages numbered "0" through "7". Likewise, for example, EB 330b includes eight pages numbered "56" through "63".

It should be noted that the layout illustrated in FIG. 3 is an example layout of an embodiment of non-volatile memory device 300. Other embodiments of non-volatile memory device 300 may include other layouts. For example, other embodiments of non-volatile memory device 300 may include more dies, EBs, and/or pages, or fewer EBs and/or pages than what is illustrated in FIG. 3.

EBs 330 may be organized into bands where a band may include one or more EBs 330. For example, in non-volatile memory device 300, EB 330*a* may be included in a first band and EB 330*b* may be included in a second band.

A band that is written by a host (e.g., processing logic 120) may be called a "host band". A "host band" that contains erased pages available for writing by a host may be called an "open host band". For example, the above-described first band may have erased pages that may be available for storing information associated with write commands that may be issued by processing logic 120. Here, the first band may be referred to as an "open host band".

A band that is written during defragmentation of a storage device may be called a "defrag band". A defrag band that contains erased pages available for use when defragmenting the storage device may be called an "open defrag band". For example, the above-described second band may have erased pages that may be available for storing information associated with defragmenting storage device 200. Here, the second band may be referred to as an "open defrag band".

Figure 4:
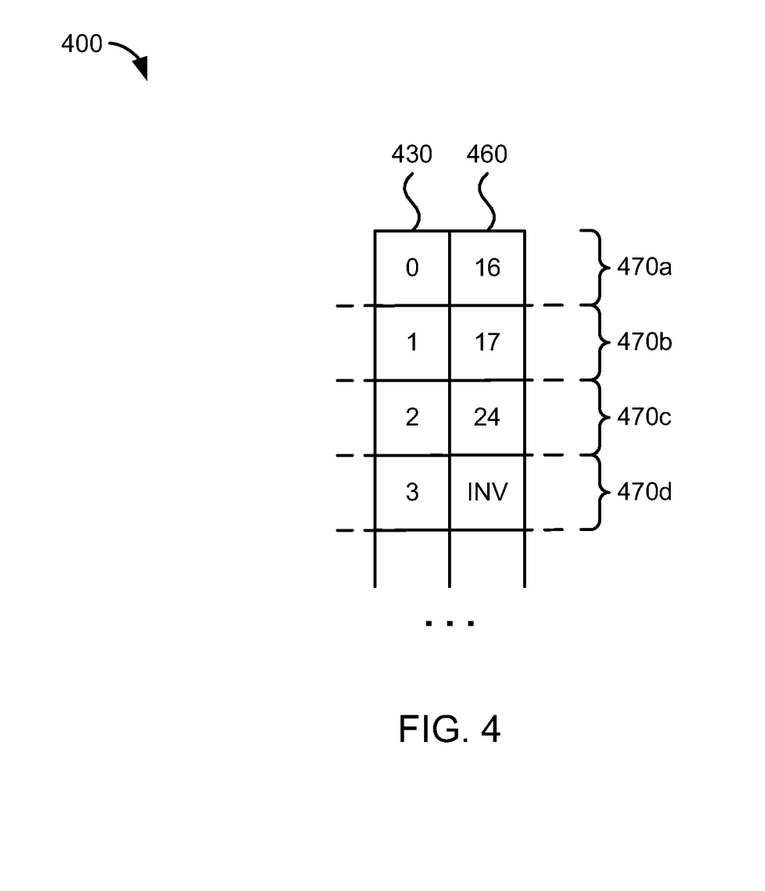
FIG. 4 illustrates an example embodiment of a logical to physical block table.

As noted above, device context 232 may include context information that may be associated with storage device 200. The context information may include L2P table 400. FIG. 4 illustrates an example embodiment L2P table 400.

Referring now to FIG. 4, L2P table 400 may include a plurality of entries 470*a-d* where an entry 470 includes an LBA field 430 and a physical address field 460. The LBA field 430 may hold a value that may represent an LBA. The LBA may be an address that may be specified by a command (e.g., read command, write command). The command may be issued by, for example, processing logic 120 to storage device 200 to access/store information in storage device 200. The physical address field 460 may hold a value that represents a physical address that may correspond to the LBA contained in the LBA field 430. The physical address may be an actual physical address (e.g., a physical page) where the information may be located in, for example, storage device 200.

For example, entry 470*a* includes an LBA field 430 that holds a value "0" and a physical address field that holds a value "16". In this example, entry 470*a* may specify that LBA "0" corresponds (maps) to physical address "16". Physical address "16" may correspond to page "16" in die 320 (FIG. 3). Likewise, for example, entry 470*b* specifies that LBA "1" corresponds to physical address "17", which may correspond to page "17" in die 320, and entry 470*c* specifies that LBA "2" corresponds to physical address of "24", which may correspond to page "24" in die 320.

Entry 470*d* specifies that LBA "3" corresponds to an invalid physical address (as indicated by the text "INV"). An invalid physical address may be a physical address that does not exist on storage device 200. For example, suppose storage device 200 contains 64 pages where each page may be associated with a physical address in the range "0" through "63", inclusive. An invalid physical address may be some value other than a value in the range of "0" through "63". For example, an invalid physical address may be the value "−1" or the value "64".

It should be noted that FIG. 4 illustrates an example embodiment of an L2P table 400 and that other embodiments of L2P table 400 that may be used by storage device 200 may be organized differently than as illustrated in FIG. 4. For example, in another embodiment an LBA may be used as an index to the L2P table 400. Here, the LBA may select an entry in the L2P table 400 that contains a physical address that corresponds to the LBA. Also other embodiments may be structured differently than illustrated in FIG. 4 and/or may contain more entries or fewer entries than illustrated in FIG. 4. For example, an entry in the L2P table may represent a range of LBAs stored at the corresponding physical address.

Referring now to FIGS. 1-4, suppose, processing logic 120 (FIG. 1) issues a command to write information to LBA "3" in secondary storage 150. The command and information may be transferred via bus 110 to secondary storage 150. Device processing logic 220 (FIG. 2) may receive the command and process it. Processing the command may include identifying a physical address associated with LBA "3". Specifically, device processing logic 220 may determine that LBA "3" corresponds to entry 470*d* (FIG. 4) in the L2P table 400 and determine that LBA "3" corresponds to an invalid physical address. Now suppose that an open host band for storage device 200 includes EB 330*a*, and that page "0" in EB 330*a* is available for writing. Device processing logic 220 may write the information to page "0" and update entry 470*d* in the L2P table 400 to indicate that logical block "3" maps to physical address "0".

Storage device 200 may support trim operations. A trim operation may be used by processing logic 120 to specify one or more LBAs that are no longer being used, for example, by processing logic 120. This may allow storage device 200 to reclaim space associated with the LBAs.

For example, a trim operation may be implemented as an attribute for an ATA Data Set Management Command that may be supported by storage device 200. The command may allow an operating system (e.g., OS 132) to inform the storage device 200 of data blocks (such as deleted files) that may be wiped internally. This function may improve compatibility, endurance, and performance.

Trim may be classified, for example, into non-deterministic trim, deterministic-zero trim, and deterministic-constant trim. A storage device that supports non-deterministic trim may return different information each time a trimmed logical block is read. A storage device that supports deterministic-zero trim may return information that contains all zeroes each time the trimmed logical block is read. A storage device that supports deterministic-constant trim may return information that contains the same data pattern (e.g., all-zeroes, all-ones) each time the trimmed logical block is read.

For example, suppose that LBA "0" is trimmed on storage device 200. Now suppose that storage device 200 supports non-deterministic trim and that processing logic 120 has issued a read command to read logical block "0" after it has been trimmed. Since storage device 200 supports non-deterministic trim, storage device 200 may return any information. A subsequent read of logical block "0" may cause different information to be returned.

Now suppose instead of supporting non-deterministic trim, storage device 200 supports deterministic-zero trim. The information returned would be all zeroes for each read of trimmed logical block "0". In addition, if in the above example storage device 200 were to support deterministic-constant trim instead non-deterministic or deterministic-zero trim, the information returned would be the same, but not necessarily all zeroes, regardless of how may read operations are performed on the trimmed logical block "0".

In storage device 200, a token may be used to record logical blocks that, for example, have been trimmed. The token may be maintained in a physical block that may be contained in a host band and/or defrag band on storage device 200.

Figure 5:
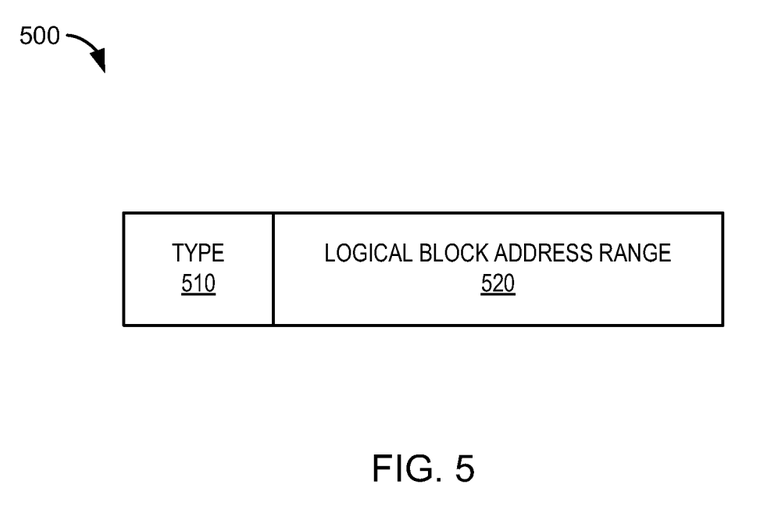
FIG. 5 illustrates an example embodiment of a trim token.

FIG. 5 illustrates an example embodiment of a trim token 500 that may be used to record logical blocks that have been trimmed on storage device 200. Referring to FIG. 5, the trim token 500 may include a type field 510 and a logical block address range field 520. It should be noted that trim token 500 is an example embodiment of a trim token that may be used to record trimmed block information and that other ways for recording trimmed block information associated with storage device 200 may be used.

The type field 510 may indicate that the trim token 500 is a token that includes trim information. The logical block address range field 520 may include a range or multiple ranges of LBAs that have been trimmed. Logical blocks that have been trimmed may be identified from the LBAs included in the logical block address range field 520.

For example, suppose processing logic 120 issues a trim command to storage device 200 to trim logical blocks in a range from logical block "0" to "3" on storage device 200. Device processing logic 220 on storage device 200 may acquire the command from bus 110 and generate a trim token 500 that (1) contains a value in the type field 510 that indicates the trim token 500 contains trim information and (2) contains a value in the logical block address range field 520 that identifies the LBAs for logical blocks "0" through "3". Device processing logic 220 may store the generated trim token 500 in an available physical block that may be contained, for example, in a host band and/or defrag band in storage device 200. In addition, device processing logic 220 may mark entries in L2P table 400 for logical blocks "0" through "3" to correspond to an invalid physical address. Specifically, device processing logic 220 may set the contents of physical address fields 460 of entries 470a-d to an invalid physical address.

Figure 6:
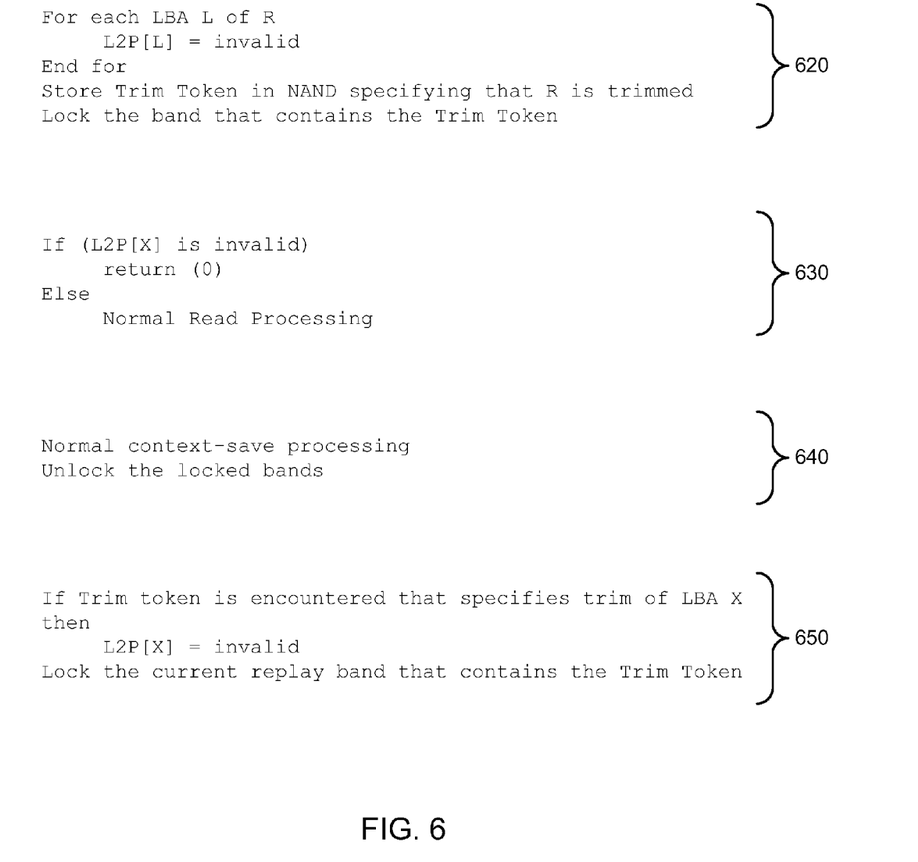
FIG. 6 illustrates example pseudo-code that may describe various operations that may be associated with a storage device.

FIG. 6 illustrates example pseudo-code that may describe various operations that may be associated with storage device 200. Referring to FIG. 6, the pseudo-code at section 620 describes operations that may be performed by storage device 200 to trim an LBA range "R".

Specifically, for each LBA "L" in range "R", the corresponding entry in the L2P table 400 is set to invalid (e.g., set to indicate an invalid physical address). For example, referring back to FIG. 4, suppose that "R" includes LBAs "0", "1", and "2". "L" may be LBA "0". The entry in L2P table 400 associated with LBAs "0" may be set to invalid by setting the physical address field 460 that correspond LBAs "0" to indicate an invalid physical address. Similarly, the entries for LBAs "1" and "2" in the L2P Table 400 may be marked to indicate invalid physical page addresses. A trim token 500 may be generated that indicates the LBAs in "R" have been trimmed and the generated trim token 500 may be stored in the non-volatile storage 240. In addition, a band that contains the trim token may be locked. Locking the band may prevent, for example, the band from being defragmented during a defragmentation of non-volatile storage 240.

Referring back to FIG. 6, the pseudo-code at section 630 describes operations that may be performed when reading information stored in storage device 200. Specifically, for an LBA "X" that is mapped to an invalid physical address, an indication may be returned that indicates the LBA is mapped to an invalid physical address. In this example, the indication is a value "0". Note that other indications may be provided. If the LBA "X" is mapped to a valid physical address, information in the valid physical address may be read and the information that is read may be returned.

The pseudo-code at section 640 describes operations that may be performed when saving device context 232 (FIG. 2) for storage device 200. Specifically, device context 232 may be saved in non-volatile storage 240. After the context is saved, bands that may have been previously locked may be unlocked.

The pseudo-code at section 650 describes operations that may be performed during, for example, PLR. A PLR may be performed after power is restored to storage device 200 to restore various state associated with storage device 200. The restored state may include, for example, a state of L2P table 400.

Referring to the pseudo-code at section 650, while performing a PLR, storage device 200 may read various physical pages in non-volatile storage 240. If a trim token is encountered that specifies a trim of an LBA "X", the physical address field 460 corresponding to that LBA in L2P table 400 may be set to an invalid physical address. In addition, a band in the L2P table 400 that contains the trim token may be locked.

Figure 7:
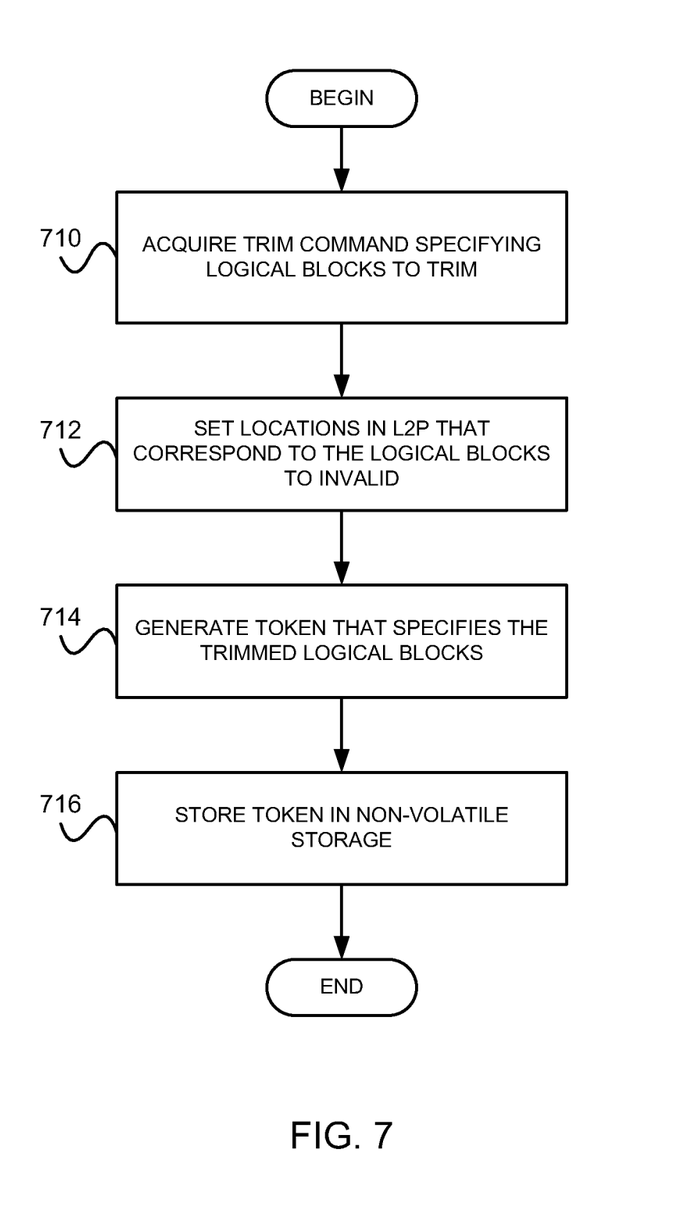
FIG. 7 illustrates a flow diagram of example acts that may be used to perform a trim operation associated with a storage device.

FIG. 7 illustrates a flow diagram of example acts that may be used to handle a trim command associated with a storage device. Referring to FIG. 7, at block 710 a trim command that may specify one or more logical blocks in a non-volatile store that may be reused may be acquired (e.g., received). At block 712, one or more locations in an L2P table that correspond to the logical blocks may be set to invalid. At block 714, in response to the command a token that specifies the trimmed logical blocks may be generated and, at block 716, the generated token may be stored non-volatile storage.

For example, referring to FIGS. 1-5 and 7, suppose that processing logic 120 (FIG. 1) issues a command to trim logical block "0" in storage device 200. The command may specify the LBA of logical block "0". The command may be transferred via bus 110 to storage device 200. Device processing logic 220 (FIG. 2) may acquire (e.g., read, receive) the command from the bus 110 and process the command. Processing the command may include determining that logical block "0" is to be trimmed.

Device processing logic 220 may set a location in L2P table 400 that corresponds to logical block "0" to invalid. Specifically, device processing logic 220 may set the physical address field 460 (FIG. 4) of entry 470a in L2P table 400 to an invalid physical address. Device processing logic 220 may generate a trim token 500 (FIG. 5) that indicates that logical block "0" has been trimmed. The trim token 500 may include the LBA of logical block "0" in field 520 of the trim token. The device processing logic 220 may store the generated trim token 500 in non-volatile storage 240. The generated trim token 500 may be stored, for example, in an available physical page (FIG. 3) that may be contained in an open host band in non-volatile storage 240.

Figure 8:
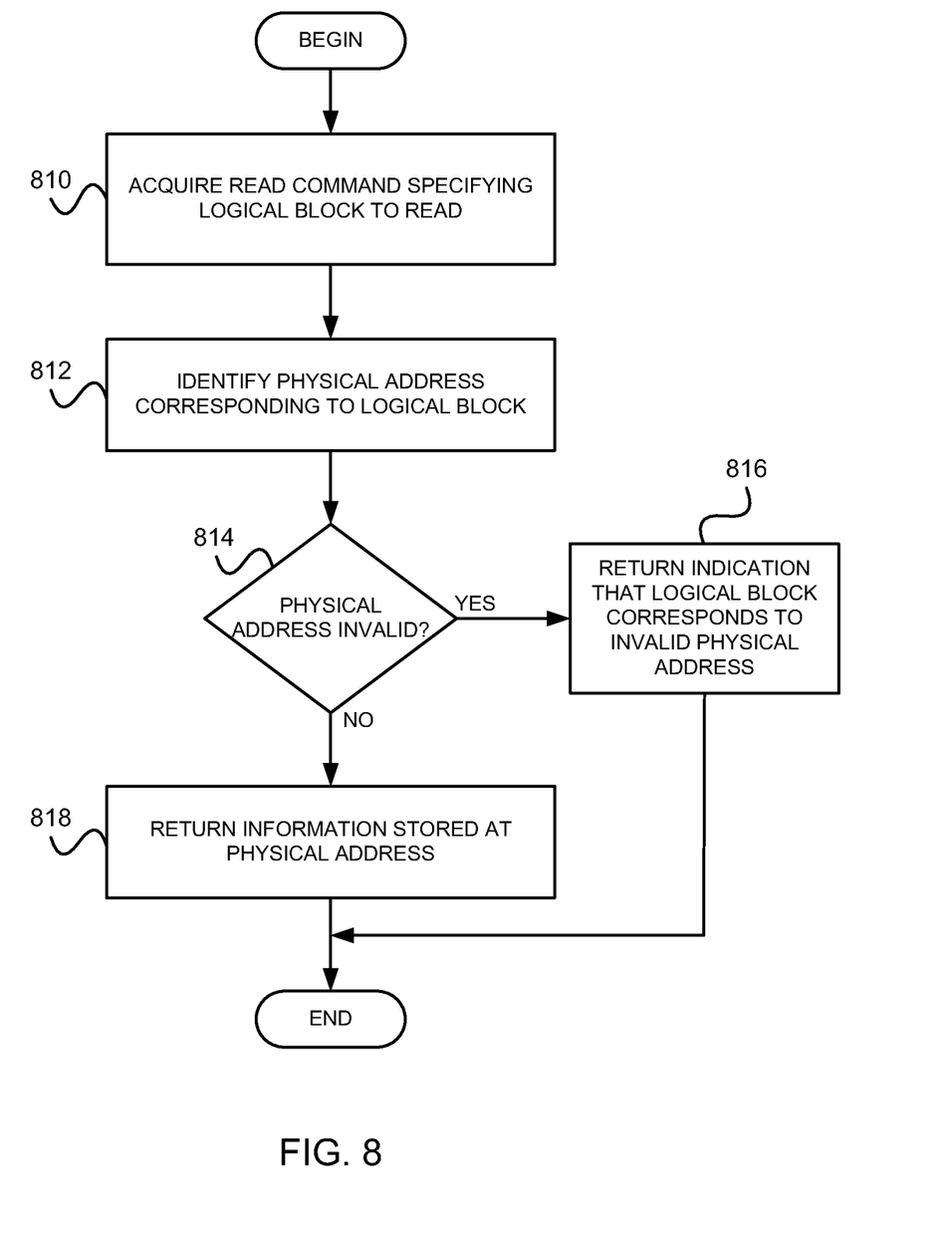
FIG. 8 illustrates a flow diagram of example acts that may be used to perform a read operation associated with a storage device.

FIG. 8 illustrates a flow diagram of example acts that may be used to handle a read command associated with a storage device. Referring to FIG. 8, at block 810, a read command that specifies a logical block to be read may be acquired. The logical block may be identified in the command using an LBA associated with the logical block. At block 812, a physical address corresponding to the logical block may be identified. At block 814, a check may be performed to determine whether the physical address is invalid. If at block 814, it is determined that the physical address is invalid, at block 816, an indication may be returned that indicates the logical block corresponds to an invalid physical address. For example, if deterministic-zero trim is supported, the indication may include an all-zeroes data pattern. If non-deterministic trim is supported, the indication may include different information for different reads of the logical block. If deterministic-zero trim is supported, the information may include all zeroes. If at block 814, it is determined that the physical address is valid (i.e., contains a valid physical address), at block 818, information stored at the physical address is returned.

For example, referring to FIGS. 1-4 and 8, suppose that processing logic 120 (FIG. 1) issues a command to read logical block "0" in storage device 200. Further suppose the command specifies the LBA of logical block "0". The command may be transferred via bus 110 to storage device 200. Device processing logic 220 (FIG. 2) may acquire (e.g., read, receive) the command from the bus 110 and process the command. Processing the command may include determining that logical block "0" in storage device 200 is to be read.

Device processing logic 220 may access an entry 470 (FIG. 4) in the L2P table 400 that corresponds to the LBA specified in the command to identify a physical address that is associated with logical block "0". Suppose device processing logic 220 accesses entry 470a and determines that page "16" (FIG. 3) on non-volatile memory device 300a is associated with the LBA specified in the command. Device processing logic 220 may determine that page "16" is a valid physical address, read information stored in page "16", and return the information via bus 110 to processing logic 120. The information may include data that processing logic 120 may direct an output device 170 (e.g., a display device) to display.

Now suppose in the above example that instead of specifying the LBA for logical block "0", the read command specifies the LBA for logical block "3". Device processing logic 220 may access entry 470d in L2P table 400 using the specified LBA and determine that logical block "3" corresponds to an invalid physical address. Device processing logic 220 may return various information based on the type of trim supported by storage device 200. For example, if storage device 200 supports non-deterministic trim, the information returned may include undefined information (e.g., may vary from one read operation to another read operation). If storage device 200 supports deterministic-zero trim, the information returned may include all zeroes. If storage device 200 supports deterministic-constant trim, the information returned may include information that may have been returned by previous read commands that specified the LBA for logical block "3".

Figure 9:
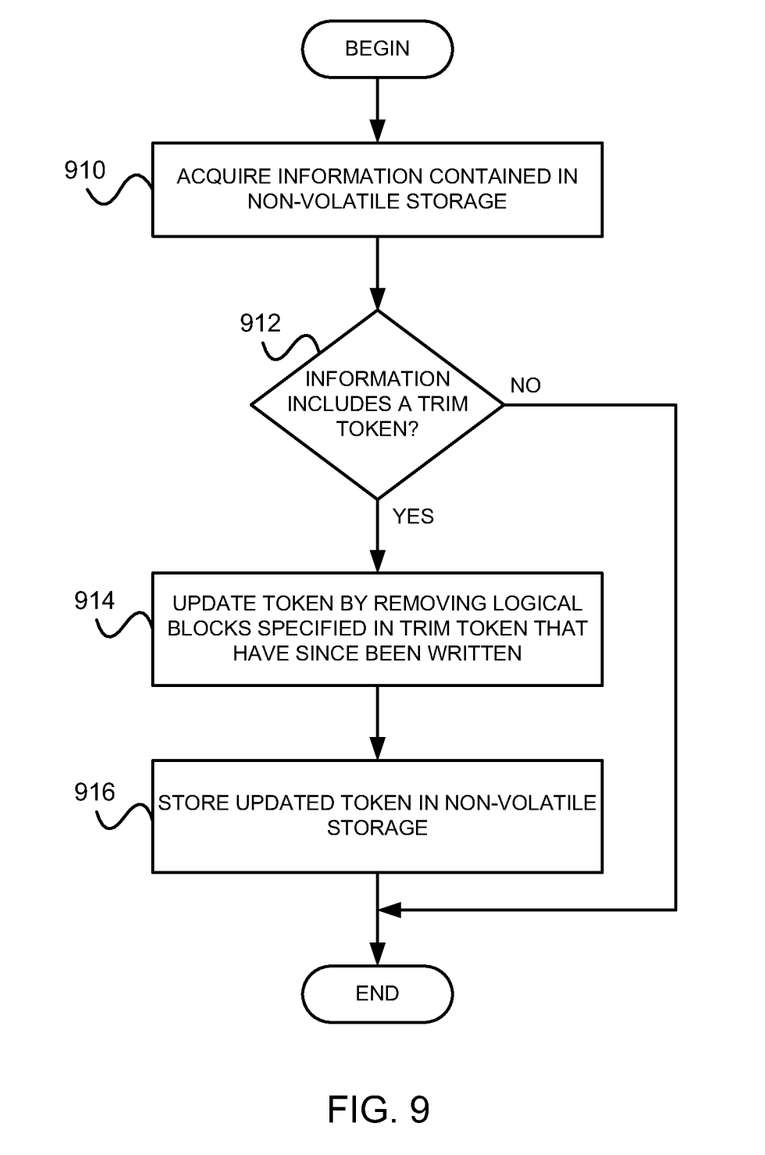
FIG. 9 illustrates a flow diagram of example acts that may be used to handle a trim token during, for example, defragmentation.

FIG. 9 illustrates a flow diagram of example acts that may be used to handle a trim token during, for example, defragmentation. At block 910, information in non-volatile storage is acquired. The information may be acquired by reading the information from a page in non-volatile storage. At block 912, a check may be performed to determine whether the acquired information contains a trim token. If so, at block 914, the trim token may be updated to remove logical blocks specified in the trim token that may have since been written. Specifically, at block 914, LBAs associated with logical blocks that may have been written since the trim token was written may be removed from the trim token. At block 916, the updated trim token may be written to non-volatile storage.

For example, referring to FIGS. 2-5, and 8, suppose that device processing logic 220 (FIG. 2) reads information from page "0" (FIG. 3) in non-volatile storage 240 during a defragmentation of non-volatile storage 240. Device processing logic 220 may access the information and determine that the information may contain a trim token 500 (FIG. 5). Device processing logic may use information in logical block address range field 520 to identify logical blocks in storage device 200 that have been trimmed.

Further, device processing logic 220 may use the LBAs contained in the logical block address range field 520 of the trim token 500 and/or the identified logical blocks with the contents of the L2P table 400 (FIG. 4) to determine whether any of the logical blocks associated with the LBAs specified in the logical block address range field 520 have been written. One way to determine whether a logical block has been written may be to determine whether a physical address field 460 of an entry 470 that corresponds to the LBA of the logical block contains a valid physical address. A valid physical address may be an address associated with a physical page contained in non-volatile storage 240. If the physical address field 460 contains a valid physical address, the logical block may be considered written.

Suppose that device processing logic 220 determines that one or more logical blocks in the range of LBAs specified in the logical block address range field 520 have been written. Device processing logic 220 may update the trim token 500 by removing LBAs associated with the written logical blocks from the logical block address range field 520. Device processing logic 220 may write the updated trim token 500 to the non-volatile storage 240. If the device processing logic 220 is defragmenting the non-volatile storage 240, device processing logic 220 may write the updated trim token 500 to an available page in an open defrag band that may be contained in the non-volatile storage 240.

Figure 10:
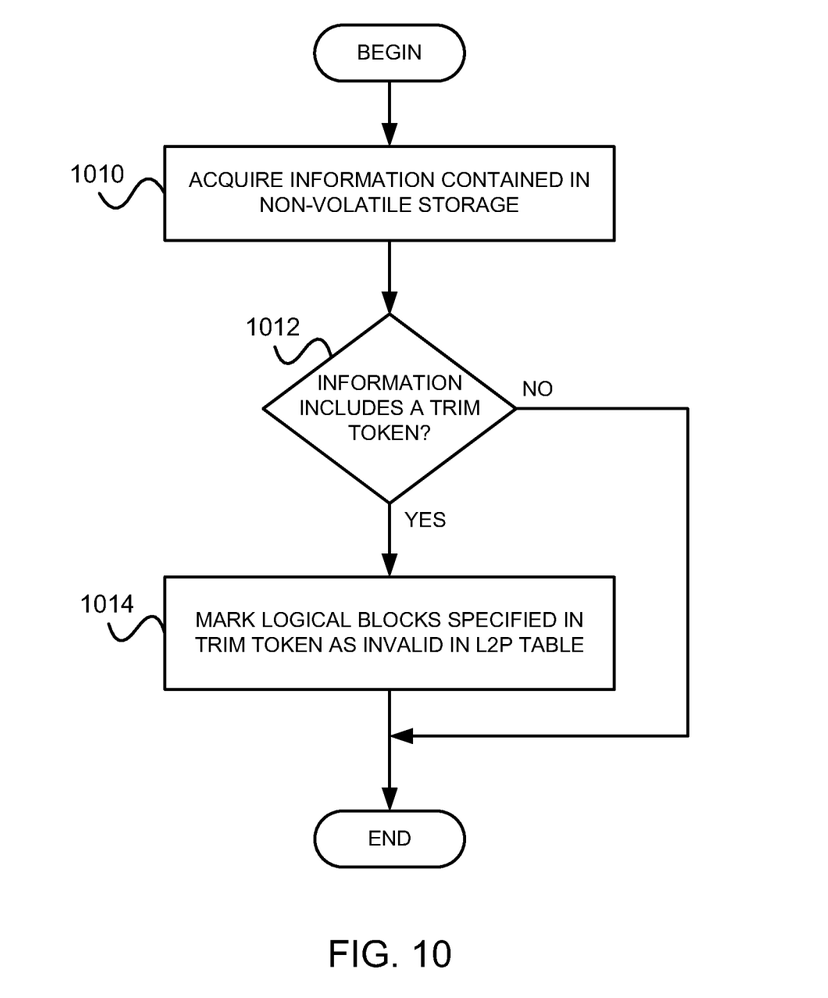
FIG. 10 illustrates a flow diagram of example acts that may be used to handle a trim token during, for example, a power loss replay (PLR).

FIG. 10 illustrates a flow diagram of example acts that may be used to handle a trim token during, for example, a power loss replay (PLR) operation associated with a storage device. Referring to FIG. 10, at block 1010 information contained in non-volatile storage may be acquired. The information may be acquired by reading information contained in a physical page in the non-volatile storage. At block 1012, a check may be performed to determine whether the information contains a trim token. If so, at block 1014, logical blocks associated with LBAs specified in the trim token may be marked as invalid in an L2P table.

For example, referring to FIGS. 2, 4, 5, and 10, suppose that device processing logic 220 (FIG. 2) reads information from a physical page in non-volatile storage 240 during a PLR operation associated with storage device 200. Device processing logic 220 may access the information and determine that the information may contain a trim token 500 (FIG. 5).

Suppose the trim token contains LBA "3" in logical block address range field 520. Device processing logic 220 may identify an entry 470 (FIG. 4) in L2P table 400 that is associated with LBA "3". Suppose that device processing logic 220 identifies that entry 470d is associated with LBA "3". Device processing logic 220 may mark the physical address associated with LBA "3" as invalid by setting the physical address field 460 associated with entry 470d to an invalid physical address.

Various variations of the above may be included in storage device 200. For example, one variation may involve storage of a trim token 500. Suppose storage device 200 does not support deterministic trim. In this case, the trim token 500 may not need to be maintained, saved, and/or processed.

Another variation may involve handling a trim command. If the trim command involves less than a particular number of LBAs, the trim command may complete without updating the L2P table or saving a trim token. For example, suppose a cutoff for the number of LBAs is 32 such that if a trim command is received by storage device 200 that specifies less than 32 LBAs to be trimmed, the storage device 200 may indicate that the trim command completed successfully without, for example, taking action to generate and store an trim token 500 associated with the trim command.

Another variation may involve ignoring non-aligned LBAs in a range of LBAs. For example, if an L2P entry represents multiple LBAs and a range of LBAs specified by a trim command involves a subset of LBAs represented by a L2P entry, then the specified LBA-range to trim may be ignored.

Here, for example, corresponding L2P entries may not be invalidated and a trim token may not be generated in response to the trim command.

Another variation may involve locking bands that contain trim tokens and not defragmenting these bands. Here, a band may be unlocked after it is closed and its context information may be saved, for example, in a non-volatile storage. This variation may obviate encountering/handling trim token updates during a defragmentation of a storage device. Further, context save frequency may be adjusted to accommodate a number of locked bands. For example, if a number of locked bands exceed a particular number "N" or if a number of locked bands that are to be defragmented exceeds a particular number "M", a context save may be performed.

Another variation may involve specifying an invalid physical address for a trimmed LBA using, for example, a flag. Here, for example, the flag may include a bit that may be stored in the L2P table 400. The bit may specify that a particular LBA is trimmed.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 7 through 10, the order of the acts may be modified in other implementations. Further, non-dependent acts may be performed in parallel.

Also, the term "user", as used herein, is intended to be broadly interpreted to include, for example, a computing device (e.g., fixed computing device, mobile computing device) or a user of a computing device, unless otherwise stated.

It will be apparent that one or more embodiments, described herein, may be implemented in many different forms of software and/or hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain features of the invention may be implemented using computer-executable instructions that may be executed by processing logic, such as processing logic 120 and/or device processing logic 220. The computer-executable instructions may be stored on one or more non-transitory tangible computer-readable storage media. The media may be volatile or non-volatile and may include, for example, DRAM, SRAM, flash memories, removable disks, non-removable disks, and so on.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A method comprising:
   in response to receiving a trim command that identifies one or more logical blocks in a non-volatile memory in a storage device that can be reused, generating a trim token that specifies the one or more logical blocks;
   storing the trim token in an open host band contained in the non-volatile memory in the storage device;
   determining whether a logical block is associated with a page designated by a previously executed trim command; and
   returning, based on the determination, an invalid address indicative of the page having been designated by the previously executed trim command.

2. The method of claim 1, wherein the logical blocks are specified using logical block addresses associated with the logical blocks.

3. The method of claim 1, wherein the trim token contains a type field that specifies the token is a trim token.

4. The method of claim 1, further comprising:
   setting a location in a logical-to-physical (L2P) table that corresponds to the logical block to invalid.

5. The method of claim 1, further comprising:
   setting a physical address that corresponds to the logical block in an L2P table to an invalid address.

6. The method of claim 1, further comprising:
   acquiring information from a block in non-volatile storage;
   determining whether the acquired information contains a trim token; and
   updating the trim token to remove logical blocks specified in the trim token that have since been written.

7. The method of claim 1, further comprising:
   acquiring information from a block in non-volatile storage;
   determining whether the acquired information contains a trim token; and
   If so, marking logical blocks associated with logical blocks specified in the trim token as invalid in a logical-to-physical (L2P) table.

8. One or more tangible non-transitory computer-readable media storing executable instructions for execution by processing logic, the one or more media storing:
   one or more instructions for generating a trim token that specifies the one or more logical blocks;
   one or more instructions for storing the trim token in an open host band contained in a non-volatile storage in the storage device;
   one or more instructions for acquiring information contained in the storage device;
   one or more instructions for determining that the acquired information includes a trim token;
   one or more instructions for determining whether a logical block is associated with a page denoted by a previously executed trim command;
   one or more instructions for returning, based on the determination, an invalid address indicative of the page having been designated by the previously executed trim command; and
   one or more instructions for modifying the trim token to remove one or more logical blocks specified in the trim token that have been written since the trim token was written to the storage device.

9. The media of claim 8, wherein the storage device is a solid-state disk.

10. The media of claim 8, wherein the one or more instructions for acquiring information includes:
one or more instructions for reading the information contained in the non-volatile storage device from a physical page contained in the non-storage device.

11. The media of claim 8, further storing:
one or more instructions for identifying one or more logical blocks that have been trimmed from the storage device based on information contained in the trim token.

12. The media of claim 8, wherein the logical blocks are specified in the trim token using logical block addresses associated with the logical blocks.

13. The media of claim 8, further storing one or more instructions for:
storing the updated token in non-volatile storage contained in the storage device.

14. The media of claim 13, wherein the updated token is stored in a defrag band contained in the storage device.

15. A system comprising:
processing logic for:
acquiring a trim command that specifies one or more logical blocks to trim in a storage device;
storing a trim token indicative of the specified logical blocks in an open host band contained in a non-volatile storage in the storage device;
setting a location in a logical-to-physical (L2P) table to invalid, the location corresponding to a logical block in the one or more logical blocks;
determining whether a logical block is associated with a page denoted by a previously executed trim command; and
returning, based on the determination, an invalid address indicative of the page having been designated by the previously executed trim command; and
a display device to display data stored in the storage device.

16. The system of claim 15, wherein the logical blocks are specified using logical block addresses associated with the logical blocks.

17. The system of claim 15, wherein the processing logic further:
generates a trim token that specifies the one or more logical blocks, and stores the trim token in the storage device.

18. The system of claim 17, wherein the trim token is stored in a host band.

19. The system of claim 18, wherein the host band is contained in a non-volatile storage in the storage device.

20. The system of claim 15, wherein setting the location in the L2P table to invalid further comprises:
setting a physical address stored at the location in the L2P table to an invalid address.

* * * * *